United States Patent
Cho

(10) Patent No.: US 8,963,985 B2
(45) Date of Patent: Feb. 24, 2015

(54) AUTOMATICALLY RINGING ELECTRONIC DOOR LOCK

(75) Inventor: Hee Moon Cho, Seoul (KR)

(73) Assignees: Hee Moon Cho, Seoul (KR); Eunson Cho, Seoul (KR)

( * ) Notice: Subject to any disclaimer, the term of this patent is extended or adjusted under 35 U.S.C. 154(b) by 143 days.

(21) Appl. No.: 13/703,815

(22) PCT Filed: Aug. 18, 2010

(86) PCT No.: PCT/KR2010/005450
§ 371 (c)(1),
(2), (4) Date: Dec. 30, 2012

(87) PCT Pub. No.: WO2012/002608
PCT Pub. Date: Jan. 5, 2012

(65) Prior Publication Data
US 2013/0208077 A1 Aug. 15, 2013

(30) Foreign Application Priority Data
Jun. 29, 2010 (KR) .................. 10-2010-0062186

(51) Int. Cl.
*G05B 19/00* (2006.01)
*E05B 17/00* (2006.01)

(52) U.S. Cl.
CPC .......... *G05B 19/00* (2013.01); *E05B 17/0083* (2013.01)
USPC ................. 348/14.06; 348/14.01; 348/14.03

(58) Field of Classification Search
CPC ........................ G05B 19/00; E05B 17/0083
USPC ........ 348/14.01, 14.06, 143; 340/5.54, 691.1, 340/573.1, 692, 5.8
See application file for complete search history.

(56) References Cited

U.S. PATENT DOCUMENTS

| 5,564,294 A | 10/1996 | Chen | |
|---|---|---|---|
| 2005/0007451 A1* | 1/2005 | Chiang | ................. 348/143 |
| 2006/0037373 A1* | 2/2006 | Case et al. | ................. 70/278.1 |

FOREIGN PATENT DOCUMENTS

| JP | 1999-243459 A | 9/1999 |
|---|---|---|
| JP | 2000-049952 A | 2/2000 |
| JP | 2000-336994 A | 12/2000 |
| JP | 2002-013327 A | 1/2002 |

(Continued)

OTHER PUBLICATIONS

KR1998-051448, Yong-Gi Kim; Opeining and Closing method of electronic door lock and apparatus thereof.*

(Continued)

*Primary Examiner* — Melur Ramakrishnaiah
(74) *Attorney, Agent, or Firm* — LRK Patent Law Firm

(57) ABSTRACT

An electronic door lock system having a doorbell for automatically ringing the doorbell is provided. The electronic door lock system includes an outdoor unit installed outside a door and provided with a keypad implemented using a numeric key area so that a password is entered so as to open and shut the door, and an indoor unit installed inside the door and configured to open and shut the door in response to door unlock and lock signals based on a password. Further, a doorbell button for calling a person in an indoor area is mounted in a predetermined place on the outdoor unit so that when the doorbell button is manipulated, a melody is output, and when the numeric key area of the keypad is pressed, a melody is output in a same manner as when the doorbell button is manipulated.

5 Claims, 1 Drawing Sheet

(56) References Cited

FOREIGN PATENT DOCUMENTS

| | | |
|---|---|---|
| JP | 2005-188056 A | 7/2005 |
| JP | 2009-044524 A | 2/2009 |
| JP | 2009-104325 A | 5/2009 |
| KR | 10-1998-0051448 A | 9/1998 |
| KR | 10-2003-0066474 A | 8/2003 |
| KR | 10-2005-0008592 A | 1/2005 |
| KR | 20-0400015 Y1 | 10/2005 |

OTHER PUBLICATIONS

KR10-2005-0008592, In-Su Gang; Dppr of Fingerprint recognition system.*
KR2003-0066474, Sang-yeol Lee, Multi-functional Door Phone Apparatus.*
International Search Report for PCT Application No. PCT/KR2010/005450.

* cited by examiner

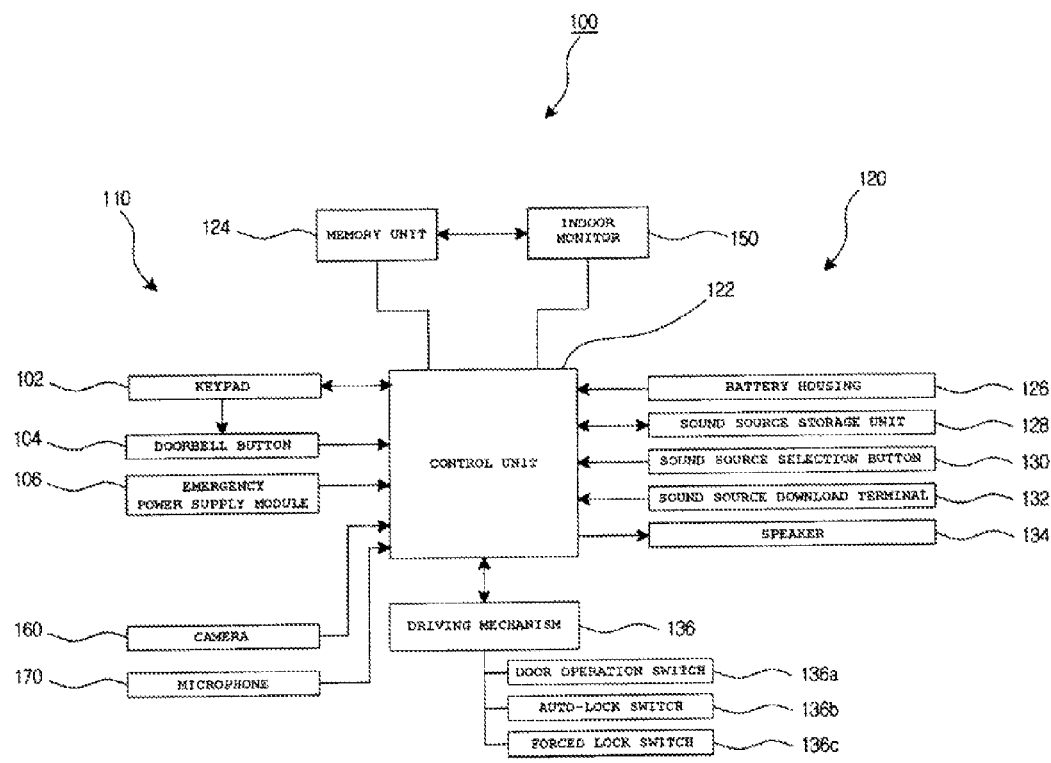

ically ringing a doorbell and, more particularly, to an electronic door lock system for automatically ringing a doorbell, which allows a person in an indoor area to easily recognize the entry of a visitor from an outdoor area by automatically ringing a doorbell when the outdoor visitor presses a keypad on the electronic door lock system so as to open the door.

AUTOMATICALLY RINGING ELECTRONIC DOOR LOCK

TECHNICAL FIELD

The present invention relates, in general, to an electronic door lock system for automatically ringing a doorbell and, more particularly, to an electronic door lock system for automatically ringing a doorbell, which allows a person in an indoor area to easily recognize the entry of a visitor from an outdoor area by automatically ringing a doorbell when the outdoor visitor presses a keypad on the electronic door lock system so as to open the door.

BACKGROUND ART

Typically, as locks used for living accommodations and security purposes and installed on doors so as to restrict visitor access, various types of door operating devices (key/lock) for opening and shutting a door via structural matching, a card-type door operating device, a voice recognition door operating device, and an operating device for opening and shutting a door by entering a password, have been used.

However, recently, in order to solve problems caused by mechanical abrasion or the like of the mechanical door operating device among the above-described door operating devices and prevent inconvenience attributable to the loss of a key, a card-type door lock system or an electronic door lock system for opening and shutting a door by entering a password has been widely popularized and utilized.

Such an electronic door lock system is configured to open and shut a door by driving an electronic solenoid without requiring a key or a lock, and is configured such that a plurality of input buttons are provided on the outside of the door so that a user may enter a password having a predetermined number of digits, or provided to open and shut the door only if an entered password matches a pre-defined password when a user touches a card to the door.

However, such an electronic door look system is generally connected to an interphone or the like in a wired manner, so that when a doorbell is pressed by an outdoor visitor, if a person in an indoor area picks up a receiver for a call or presses a button for a call, a conversation with the outdoor visitor can be held while video for an outdoor area is being displayed on a monitor. Further, the electronic door lock system is configured such that when a door unlock button is pressed to open the door in an indoor area after identifying the visitor, an unlock signal is output from the main body of the door lock system present in the indoor area and then the door can be unlocked, and such that the operation of locking the door again from the indoor area in the unlocked state can be performed.

However, most current electronic door lock systems are problematic in that they are configured to perform only the function of opening and shutting a door, or only a function related to security, and in that a doorbell for calling an indoor area from an outdoor area is installed separately from a door lock, so that not only is man-hour required to install such a doorbell increased, but also the related cost, and the outer appearance of the door may be defiled due to the doorbell.

In order to solve the conventional problem, Korean Utility Model No. 400015 proposed an electronic door lock system provided with a doorbell. The electronic door lock system provided with a doorbell, disclosed in the above Korean Utility Model No. 400015, is configured to include an outdoor unit installed outside a door and provided with a keypad to enter a password required to open and shut the door, and an indoor unit installed inside the door and configured to open and shut the door in response to door unlock and lock signals based on the password input from the outdoor unit. The electronic door lock system is configured such that a doorbell button for calling a person in an indoor area is mounted in a predetermined place on the outdoor unit so that when the doorbell button is manipulated, a previously selected melody is output from a sound source storage unit in which one or more melodies are stored.

In the above-described conventional electronic door lock system, the doorbell is provided to be merely integrated with the door lock and a visitor must press the doorbell. Furthermore, a current electronic door lock system is installed such that an outdoor view is displayed on the monitor of an indoor video phone provided in the indoor area at the same time that the doorbell is operated and the displayed outdoor view is recorded.

Therefore, a problem arises in that when the doorbell is not pressed, the identity of a visitor cannot be known, and in that even if a person is present in the indoor area, it is difficult for the person to easily recognize that another person is coming in from the outdoor area when he or she opens the door using the numeric key area of the keypad provided on the door lock and enters the indoor area without pressing the doorbell.

Furthermore, the door lock is frequently used to input a password, so traces of use remain on the numeric key area. Thus, a problem arises in that a visitor can break into an indoor area using a numeric key area having traces of use, or can easily break into the indoor area using the numeric key area when a password is exposed due; to the carelessness of children.

DISCLOSURE

Technical Problem

Accordingly, the present invention has been made keeping in mind the above problems occurring in the prior art, and an object of the present invention is to provide an electronic door lock system for automatically ringing a doorbell, which enables the numeric key area of the keypad of an electronic door lock provided with a doorbell to be used as a doorbell switch, so that even if any one of the numeric key area of the keypad of the electronic door lock and the doorbell is pressed, the doorbell is rung, thus allowing a person in an indoor area to easily recognize that a visitor is present in an outdoor area and also allowing the person in the indoor area to recognize that the visitor is coming in from the outdoor area.

Technical Solution

In order to accomplish the above object, the present invention provides an electronic door lock system for automatically ringing a doorbell, the electronic door lock system having the doorbell, including an outdoor unit installed outside a door and provided with a keypad implemented using a numeric key area so that a password is entered so as to open and shut the door, and an indoor unit installed inside the door and configured to open and shut the door in response to door unlock and lock signals based on a password input from the outdoor unit, wherein a doorbell button for calling a person in an indoor area is mounted in a predetermined place on the outdoor unit so that when the doorbell button is manipulated, a melody is output, and wherein when the numeric key area of the keypad is pressed, a melody is output in a same mariner as when the doorbell button is manipulated.

Preferably, the doorbell may be rung to output a melody even when a card key or a magnetic key (hereinafter referred to as a "touch key") having storage means for inputting a password set in the door lock system to unlock the door lock system is caused to touch the door lock system.

Preferably, a melody output when the doorbell button is pressed, a melody output when the numeric key area of the keypad is pressed, and a melody output when an entrance is opened using a touch key may be set to different melodies.

Preferably, when the numeric key area of the keypad provided in the door lock system is pressed, an outdoor view may be displayed or a monitor of an indoor video phone, thus enabling identity of a visitor to be determined.

Preferably, video may be recorded when a monitor of an indoor video phone is operated.

Advantageous Effects

The electronic door lock system for automatically ringing a doorbell according to the present invention is advantageous in that it enables the numeric key area of the keypad of an electronic door lock system provided with a doorbell to be used as a doorbell switch, so that even if any one of the numeric key area of the keypad of the electronic door lock and the doorbell is pressed, the doorbell is rung, thus allowing a person in an indoor area to easily recognize that a visitor is present in an outdoor area and also allowing the person in the indoor area to recognize that the visitor is coming in from the outdoor area.

DESCRIPTION OF DRAWINGS

FIG. 1 is a block diagram showing an electronic door lock system for automatically ringing a doorbell according to the present invention.

MODE FOR INVENTION

Hereinafter, a preferred embodiment of the present invention will be described in detail, with reference to the attached drawing. FIG. 1 is a block diagram showing the configuration of an electronic door lock system for automatically ringing a doorbell according to the present invention. Referring to the drawing, an electronic door lock system 100 according to the present invention includes an outdoor unit 110 and an indoor unit 120. The outdoor unit 110 includes a keypad 102 installed outside a door and implemented using a numeric key area to enable a password to be entered so as to open and shut the door, and includes an emergency power supply module 106 and a doorbell button 104 used to call an indoor area from an outdoor area. The indoor unit 120 is installed inside the door and configured to open and close the door in response to door unlock and lock signals based on a password input from the outdoor unit 110.

The keypad 102 or the emergency power supply module 106 is protected by a cover that is slidably moved or that is rotatably moved by a predetermined angle on the outer surface of the keypad 102 so that the keypad 102 is not exposed to the outside.

The indoor unit 120 is configured to include a memory unit 124 for storing is password, a battery housing 126 for accommodating a battery, a sound source storage unit 128 for storing sound sources so that a predetermined voice, a melody, or the like is output when the password is pressed or the doorbell button 104 is manipulated, a sound source selection button 130 configured to select a sound source to be output when the doorbell button 104 is manipulated, a sound source download terminal 132 for downloading sound sources, a speaker 134 for outputting the sound sources, a driving mechanism 136 for opening and shutting the door, and a control unit 122 for controlling the overall operation of the individual components.

The sound source download terminal 132 is implemented as the corresponding connector so that a user can simply download sound sources, for example, sound sources stored in a cellular phone or a Personal Digital Assistant (PDA).

The driving mechanism 136 includes a door operation switch 136a, an auto-lock switch 136b, a forced lock switch 136c, etc. This configuration is described in detail in a well-known electronic, door lock system, and thus a detailed description thereof will be omitted in the present specification.

Meanwhile, the identity of a visitor can be determined using a microphone 170, an indoor monitor 150, a camera 160, etc. for communication between the indoor area and the outdoor area. Since this configuration is also described in detail in a well-known electronic doorbell enabling the identity of a visitor to be determined, a detailed description thereof will be omitted in the present specification.

Below, the operation of the present invention will be described. The electronic door lock system 100 of the present invention is configured such that when the numeric key area constituting part of the keypad 102 is externally manipulated and a password is entered, it is determined by the control unit 122 whether the entered password matches a password preset in the memory unit 124, and thus the opening and closing of the door are controlled.

In this case, upon utilizing the electronic door lock system 100, when a visitor visits, the visitor calls a person in the indoor area by pressing a doorbell installed separately from the electronic door look system 100 in a conventional scheme. However, in the present invention, when the doorbell button 104 exposed to the outdoor unit 110 of the door is pressed, a manipulation signal, from the doorbell button 104 is applied to the control unit 122 of the indoor unit 120. When the control unit 122 outputs an arbitrary melody stored in the sound source storage unit 126 through the speaker 134 to indicate that the visitor is calling from the outdoor area, the person in the indoor area can converse with the visitor via the microphone 170 and the speaker 134 provided for communication between the indoor and outdoor areas.

That is, since the doorbell button 104 is formed to be integrated with the electronic door lock system 100, there is no need to separately install the doorbell, thus enabling the outside of the door to be aesthetically appealing. Meanwhile, the melody output by the manipulation of the doorbell button 104 can be freely changed according to the manipulation of the sound source selection button 130. The manipulation of the sound source selection button 130 enables any one of sound sources stored in the sound source storage unit 125 to be selected after the user listens to the stored sound sources.

Furthermore, the sound source storage unit 128 is implemented as erasable memory, and thus the user can delete data pertaining to a sound source stored in the round source storage unit 128 and store data pertaining to another sound source. The storage of the sound source data is performed through the sound source download terminal 132. The sound source data can be downloaded from, for example, a cellular phone, a PDA, a Portable Media Player (PMP), or an MPEG3 (MP3) player which is a personal portable terminal. For this function, the sound source download terminal 132 must be provided with a connector having the same structure and the same transfer protocol, as the connector provided to the cellular phone, PDA, PMP or MP3 player.

As described above, when the doorbell is pressed to indicate that a visitor is calling the indoor area from the outdoor area, the camera 160 is operated at the same time that the doorbell button 104 is manipulated, so that the outdoor visitor is displayed on the indoor monitor 150 installed indoors. Meanwhile, video captured by the camera 160 that is operated at the same time that the doorbell button 104 is manipulated is stored in the memory unit 124.

Further, in the same manner as when the doorbell button 104 is manipulated, in a case where the numeric key area of the keypad 102 is pressed to enter a password so as to enter the indoor area using the door lock system, the melody stored in the sound source storage unit 128 is output.

For example, when the keypad 102 or the doorbell button 104 is manipulated, the corresponding manipulation signal is applied to the control unit 122 of the indoor unit 120. The control unit 122 outputs an arbitrary melody stored in the sound source storage unit 128 through the speaker 134, thus indicating that the visitor is coming in from the outdoor area.

Meanwhile, the camera 150 is operated at the same time that the keypad 102 is manipulated, so that the outdoor visitor is displayed on the indoor monitor 160 installed indoors. Further, similar to the manipulation of the doorbell button 104, the camera 160 is operated to capture video at the same time that the keypad 102 is manipulated, and the captured video is stored in the memory unit 124.

Meanwhile, even when a touch key provided with a storage means for inputting the password set in the door lock system to unlock the door lock system is caused to touch the door lock system so as to enter an entrance using the touch key, the doorbell can be rung and the corresponding melody can be output.

If a melody output when the doorbell button 104 is pressed, a melody output when the numeric key area of the keypad 102 is pressed, and a melody output when the entrance is opened using the touch key can be set, to different melodies, the entrance and exit of a family member or the like and the entrance and exit of an unknown party can be distinguished from each other even using melodies. Therefore, by utilizing the electronic door lock system to which the technology of the present invention is applied, all persons who enter and leave the entrance and all persons who press the doorbell can be recorded and stored, and a person in an indoor area can easily identify the persons, thus obtaining an advantage in that security and convenience can be provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electronic door lock system for automatically ringing a doorbell, the electronic door lock system having the doorbell and comprising:
    an outdoor unit installed outside a door and provided with a keypad implemented using a numeric key area so that a password is entered so as to open and shut the door; and
    an indoor unit installed inside the door and configured to open and shut the door in response to door unlock and lock signals based on a password input from the outdoor unit,
    wherein a doorbell button for calling a person in an indoor area is integrated with the outdoor unit and is mounted in a predetermined place on the outdoor unit so that when the doorbell button is manipulated, a melody is output, and
    wherein when the numeric key area of the keypad is pressed, a melody is output in a same manner as when the doorbell button is manipulated.

2. The electronic door lock system of claim 1, wherein the doorbell is rung to output a melody even when a card key or a magnetic key (hereinafter referred to as a "touch key") having storage means for inputting a password set in the door lock system to unlock the door lock system is caused to touch the door lock system.

3. The electronic door lock system of claim 1, wherein a melody output when the doorbell button is pressed, a melody output when the numeric key area of the keypad is pressed, and a melody output when an entrance is opened using a touch key can be set to different melodies.

4. The electronic door lock system of claim 1, wherein when the numeric key area of the keypad provided in the door lock system is pressed, an outdoor view is displayed on a monitor of an indoor video phone, thus enabling identity of a visitor to be determined.

5. The electronic door lock system of claim 1, wherein video is recorded when a monitor of an indoor video phone is operated.

\* \* \* \* \*